US010891472B2

(12) United States Patent
Elwazer et al.

(10) Patent No.: US 10,891,472 B2
(45) Date of Patent: Jan. 12, 2021

(54) AUTOMATIC BODY MOVEMENT RECOGNITION AND ASSOCIATION SYSTEM

(71) Applicant: KinTrans, Inc., Dallas, TX (US)

(72) Inventors: Mohamed Elwazer, Dallas, TX (US); Catherine Bentley, Dallas, TX (US); Hazem Said Ahmed Mohammed, Cairo (EG)

(73) Assignee: Kintrans, Inc., Dallas, TX (US)

( * ) Notice: Subject to any disclaimer, the term of this patent is extended or adjusted under 35 U.S.C. 154(b) by 0 days.

(21) Appl. No.: 16/774,670

(22) Filed: Jan. 28, 2020

(65) Prior Publication Data
US 2020/0167555 A1 May 28, 2020

Related U.S. Application Data

(62) Division of application No. 15/613,201, filed on Jun. 3, 2017, now Pat. No. 10,628,664.
(Continued)

(51) Int. Cl.
*G06K 9/00* (2006.01)
*G06F 16/24* (2019.01)
(Continued)

(52) U.S. Cl.
CPC ......... *G06K 9/00342* (2013.01); *G06F 16/24* (2019.01); *G06K 9/00214* (2013.01);
(Continued)

(58) Field of Classification Search
CPC ........... G06K 9/00214; G06K 9/00335; G06K 9/00342; G06K 9/4604; G06K 9/6269;
(Continued)

(56) References Cited

U.S. PATENT DOCUMENTS

| 5,887,069 A | 3/1999 | Sakou et al. |
| 8,224,652 B2 | 7/2012 | Wang et al. |

(Continued)

FOREIGN PATENT DOCUMENTS

KR 1020160109708 9/2016

*Primary Examiner* — Tom Y Lu
(74) *Attorney, Agent, or Firm* — Mercedes V. O'Connor; Rockman Videbeck & O'Connor

(57) ABSTRACT

An automatic body movement recognition and association system that includes a preprocessing component and a "live testing" engine component. The system further includes a transition posture detector module and a recording module. The system uses three dimensional (3D) skeletal joint information from a stand-alone depth-sensing capture device that detects the body movements of a user. The transition posture detector module detects the occurrence of a transition posture and the recording module stores a segment of body movement data between occurrences of the transition posture. The preprocessing component processes the segments into a preprocessed movement that is used by a classifier component in the engine component to produce text or speech associated with the preprocessed movement. An "off-line" training system that includes a preprocessing component, a training data set, and a learning system also processes 3D information, off-line from the training data set or from the depth-sensing camera, to continually update the training data set and improve a learning system that sends updated information to the classifier component in the engine component when the updated information is shown to improve accuracy.

10 Claims, 13 Drawing Sheets

Related U.S. Application Data

(60) Provisional application No. 62/345,776, filed on Jun. 4, 2016.

(51) Int. Cl.
*G06T 7/11* (2017.01)
*H04N 13/204* (2018.01)
*G06K 9/62* (2006.01)
*G06K 9/72* (2006.01)
*H04N 13/271* (2018.01)
*G06K 9/46* (2006.01)

(52) U.S. Cl.
CPC ............ *G06K 9/6269* (2013.01); *G06K 9/72* (2013.01); *G06T 7/11* (2017.01); *H04N 13/204* (2018.05); *G06K 9/4604* (2013.01); *G06T 2207/10016* (2013.01); *H04N 13/271* (2018.05)

(58) Field of Classification Search
CPC ... G06K 9/72; G06T 2207/10016; G06T 7/11; H04N 13/271; H04N 13/204; G06F 16/24
See application file for complete search history.

(56) References Cited

U.S. PATENT DOCUMENTS

| | | | |
|---|---|---|---|
| 8,971,572 B1* | 3/2015 | Yin | G06K 9/00624 |
| | | | 382/103 |
| 9,372,540 B2 | 6/2016 | Park et al. | |
| 9,465,488 B2 | 10/2016 | Howard | |
| 2002/0159641 A1* | 10/2002 | Whitney | G06K 9/6228 |
| | | | 382/219 |
| 2003/0208289 A1 | 11/2003 | Ben-Arie | |
| 2004/0186695 A1 | 9/2004 | Aoshima et al. | |
| 2010/0277579 A1 | 11/2010 | Cho et al. | |
| 2011/0301934 A1 | 12/2011 | Tardif | |
| 2012/0191635 A1* | 7/2012 | Bigio | A61B 5/0059 |
| | | | 706/13 |
| 2012/0214594 A1 | 8/2012 | Kirovski et al. | |
| 2013/0051614 A1 | 2/2013 | Lee et al. | |
| 2013/0058565 A1 | 3/2013 | Rafii et al. | |
| 2013/0336524 A1 | 12/2013 | Zhang et al. | |
| 2016/0042228 A1* | 2/2016 | Opalka | G06F 16/5838 |
| | | | 382/103 |
| 2018/0120420 A1* | 5/2018 | McMahon | G01S 13/62 |

* cited by examiner

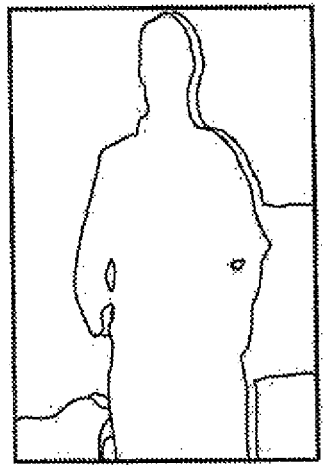 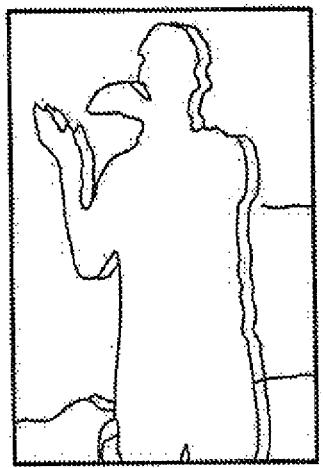 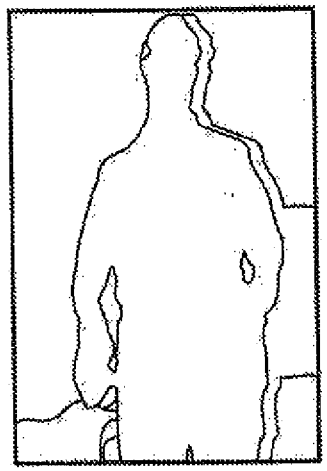
FIG. 4A  FIG. 4B  FIG. 4C
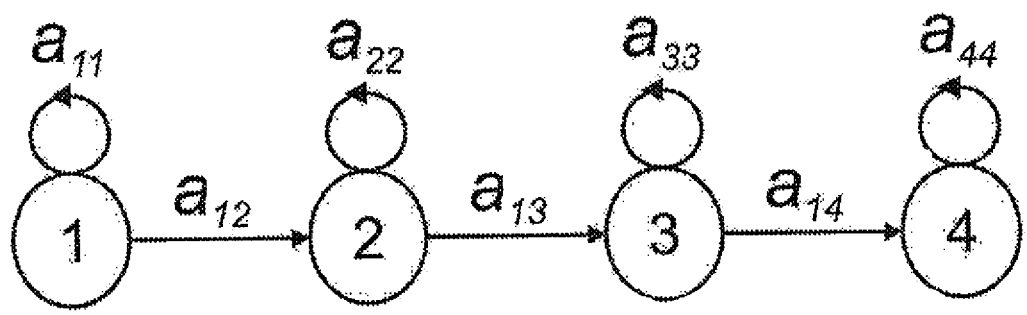
FIG. 6

Single Tetrahedron. The circles represents four different skeleton s joints. The arrow represents Tetrahedron Direction. Note that Tetrahedron is a 3D shape.

US 10,891,472 B2

AUTOMATIC BODY MOVEMENT RECOGNITION AND ASSOCIATION SYSTEM

CROSS-REFERENCE TO RELATED APPLICATION(S)

This application claims priority to and is a divisional application of U.S. Non-provisional application Ser. No. 15/613,201, filed Jun. 3, 2017, and claims priority to U.S. Provisional Application No. 62/345,776, filed Jun. 4, 2016, to the extent allowed by law and the contents of which are incorporated herein by reference in their entireties.

TECHNICAL FIELD

This disclosure relates to an automatic body movement recognition and association system.

BACKGROUND

The recognition of human body movement is used in a wide variety of fields and applications. Body movement is used, for example, in motion gaming systems to play games and sports, in psychology to interpret a person's emotions through their body language, in medicine to diagnose certain ailments or conditions, and in sign language to communicate with a hearing impaired person. Each body movement or combination of body movements has a meaning in each respective application, such as the specific video game, psychological condition, medical condition, and/or sign language. Interpreting these body movements, however, requires knowledge in the field, such as a trained psychologist, a trained medical professional, or a trained sign language interpreter. The automatic body movement recognition and association system, using three dimensional skeleton data from a stand-alone depth-sensing image capture device, provides more accurate body movement recognition and the ability to capture body movements in real-time and automatically associate those body movements with a meaning, such as a video game move, an emotion, a medical condition, or other written or spoken words or phrases, thereby allowing a person without any prior training or knowledge to understand the body movements as they are being captured.

SUMMARY

This disclosure relates generally to an automatic body movement recognition system. The teachings herein can provide a system that automatically translates sign language into written or spoken words. One implementation of method for associating a meaning to a sequence of body motions of a user includes receiving at least one database; receiving the sequence of body motions from a depth-sensing capture device, wherein the sequence of body motions comprises a set of three dimensional coordinates of a plurality of points of a skeleton of the user; identifying, using a detection module, at least two occurrences of a predetermined position in the sequence of body motions; identifying, using a recording module, a segment of body motions based on the sequence of body motions between the two occurrences of the predetermined position, wherein the segment of body motions comprises a subset of three dimensional coordinates from the set of three dimensional coordinates; processing, using a preprocessing component, the segment of body motions into at least one preprocessed movement; and identifying, using a classifier component, a set of words based on the at least one preprocessed movement.

One implementation of a method for building an isolated body movement recognizer includes identifying at least one learning database comprising a plurality of training data; preprocessing, using a preprocessing component, the training data into preprocessed training data; training the classifier based on the preprocessed training data; testing a stability of the classifier; testing an accuracy of the classifier; generating a full testing report based on the stability and the accuracy of the classifier; and storing the classifier to a plurality of classifiers.

One implementation of a system for motion recognition of a sequence of body motions of a user that includes a detection module adapted to identify at least two occurrences of a predetermined position in the sequence of body motions based on three dimensional data received from a depth-sensing capture device; a recording module adapted store a segment of body motions comprising a set of three dimensional coordinates, based on the three dimensional data, received between the two occurrences; a preprocessing component adapted to process the segment of body motions into a preprocessed movement; and a classifier component adapted to identify a decoded statement based on the preprocessed movement.

Variations in these and other aspects of the disclosure will be described in additional detail hereafter.

BRIEF DESCRIPTION OF THE DRAWINGS

The description herein makes reference to the accompanying drawings wherein like reference numerals refer to like parts throughout the several views, and wherein:

FIG. 4A illustrates an exemplary transition posture to be detected by the automatic body movement recognition and association system in accordance with implementations of this disclosure;

FIG. 4B illustrates an exemplary body movement motion to be detected by the automatic body movement recognition and association system in accordance with implementations of this disclosure;

FIG. 4C illustrates an exemplary transition posture to be detected by the automatic body movement recognition and association system in accordance with implementations of this disclosure;

FIG. 6 illustrates an exemplary left-right Hidden Markov Model utilized in the exemplary automatic body movement recognition and association system in accordance with implementations of this disclosure;

DETAILED DESCRIPTION

Figure 1A:
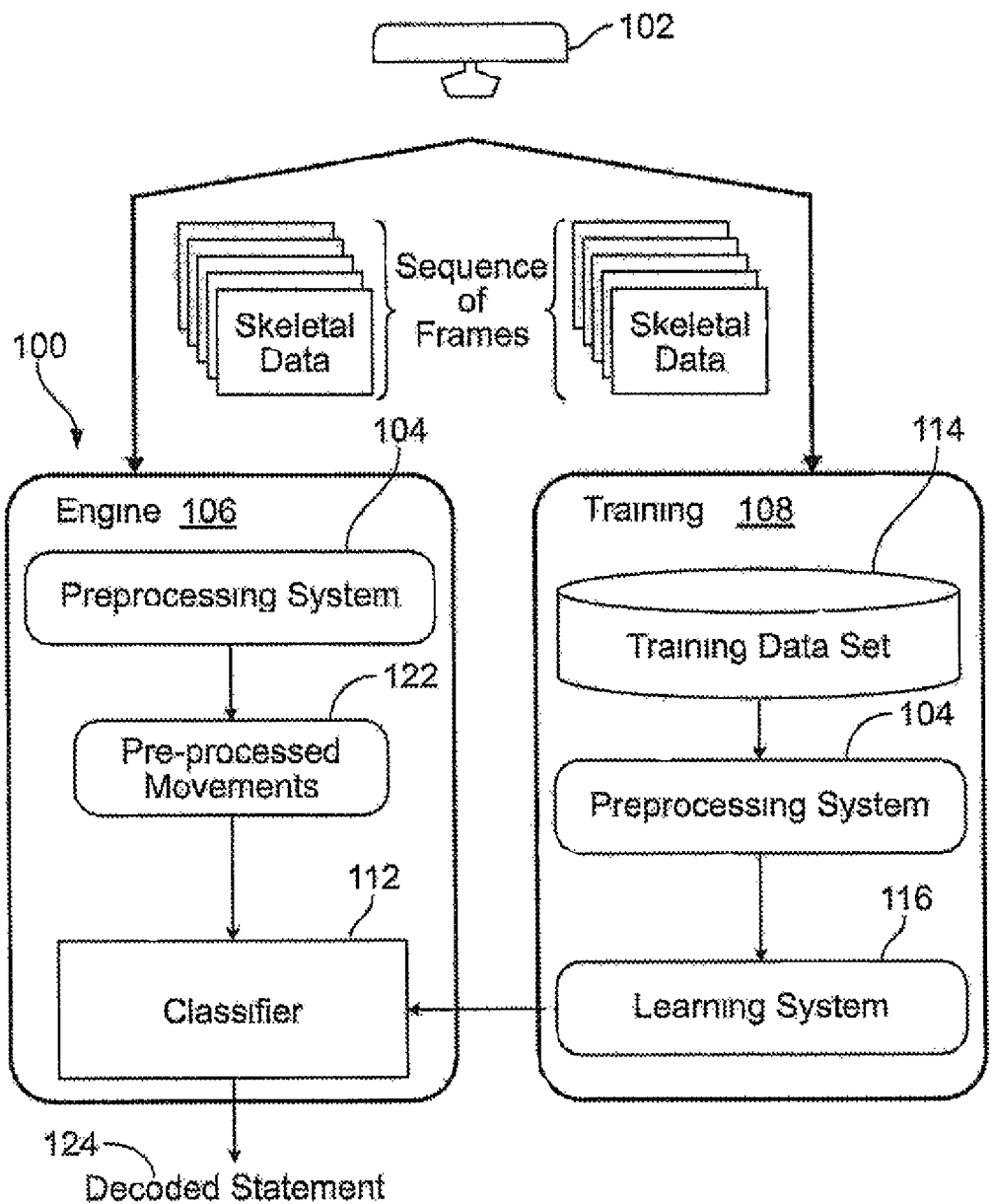
FIG. 1A illustrates a field implementation of an exemplary automatic body movement recognition and association system in accordance with implementations of this disclosure, showing a "live testing" engine component, and a field implementation of an exemplary "off-line" training system.

An automatic body movement recognition and association system described herein provides real-time, or near real-time, body movement recognition and associates the body movements, or combination of body movements, into any number of meanings represented by the system in written or spoken words. The automatic body movement recognition and association system comprises a "live testing" component to produce text or speech associated with the movement and an "off-line training" component that continually updates a training data set to improve a learning system that is used in the "live testing" component. The automatic body movement recognition and association system uses three dimensional skeletal data read from a stand-alone a depth-sensing image capture device or depth-sensing camera to capture a person's body movements and then associates the body movements with any number of meanings, such as medical symptoms and/or conditions, sign language interpretation, psychological conditions, and human emotions for use in medical environments, military environments, school environments, etc., depending on the field of use.

The automatic body movement recognition and association system of the present disclosure has the ability to recognize full body movement on different bodies and unify the full body movement across different customized movement dictionaries, while keeping all the processing in real time, maintaining high accuracy across a huge number of movement classes, and maintaining high accuracy with a very low number of samples per each movement class, such samples as low as ten samples per class.

In an exemplary implementation, the automatic body movement recognition and association system is used for translating sign language into written and spoken words in user/signer dependent and user/signer independent settings. The automatic body movement recognition and association system in this implementation uses three dimensional skeletal data read from the stand-alone depth-sensing camera to capture sign language and then recognize the signs, associate the sign or combination of signs with a meaning, and produce written or spoken words associated with the sign or combination of signs.

Sign language is used by hearing impaired people around the world. Hearing impaired children learn sign language as their first language from their environment in much the same manner as hearing children learn spoken language from their family and others. Currently, there is no standard sign language that is used throughout the world. Sign language differs from one country to another, forming many different sign languages such as American Sign Language, British Sign Language, and a wide range of Arabic Sign Languages. In the Arab world alone, there are several Arabic sign languages including Egyptian, Kuwaiti, and Jordanian sign languages. Standardized Arabic sign language does exist but is still not widely used. Further, the number of hearing people who are able to communicate in sign language is low when compared to the millions of hearing impaired people that need to communicate and interact with others in their day to day life activities. There exists a growing need to remove linguistics barriers facing hearing impaired people in their daily life.

Building a system that is able to automatically translate sign language into written and spoken words can help in removing the linguistic barriers facing the deaf community, especially in case of emergencies and in normal daily life situations. The automatic body movement recognition and association system of the present disclosure can be implemented as a sign language translator system to automatically translate sign language into written and spoken words, thereby providing a system that aids in removing the linguistic barriers facing the deaf community, especially in case of emergencies and in normal daily life situations.

Signs in a sign language contain not only manual features, i.e., hand motion and shapes, but also non-manual features such as facial expressions Like spoken languages, sign languages have thousands of signs which differ from each other by changes in hand motion, hand shapes, hand position, movement of the head, limbs, and torso, and the relative positions of the rest of the body movements with the hands. The automatic body movement recognition and association system utilizes the relation between the sign language and the system to perform the body movement recognition. Most sign language recognition systems are vision based. The automatic body movement recognition and association system of the present disclosure uses depth image cameras to acquire user depth data, such as the three dimensional locations of both manual, such as the user's hands and the user's hand shape, and non-manual features, such as head, limb, and torso movement, to automatically analyze and recognize the human skeleton detection data and to overcome the many challenges facing normal two dimensional color camera based translators.

Continuous body movement recognition can be achieved based on the assumption that body movements can be broken down into a subset of several smaller units called phonemes or chremes, which can then be segmented based on the change in the movement's direction or hand location relative to the camera and relative to the position of the rest of the body, taking into consideration noisy data, whether the body part is moving in one direction, and whether there are location points that are misleading due to error. In sign language, however, the transition between signs is not clearly marked because the signer's hands will be moving to the starting position of the next sign, which makes segmenting the signs by detecting the starting point and the ending point problematic. These movement epenthesis', which occur most commonly during the boundary between signs as the hands move from the posture required by the first sign to the posture required by the next, can be used to segment the signs or group of signs when detected in the three dimensional data read from the depth camera. After the movements have been broken down into segments, the phonemes are processed using isolated sign language recognition.

FIG. 1A is a block diagram of a field implementation of an automatic body movement recognition and association system 100 in accordance with implementations of this disclosure. The system 100 comprises a "live testing" engine component 106 that includes a preprocessing component 104 and a classifier component 112. The system 100 utilizes three dimensional (3D) skeletal data read from a stand-alone depth-sensing camera 102 that captures the 3D coordinates of skeletal joints in a sequence of frames. The system 100 processes the 3D data into a series of segmented movements 110 (FIG. 1B) that are then used by the classifier component 112 to produce text or speech.

Figure 1B:
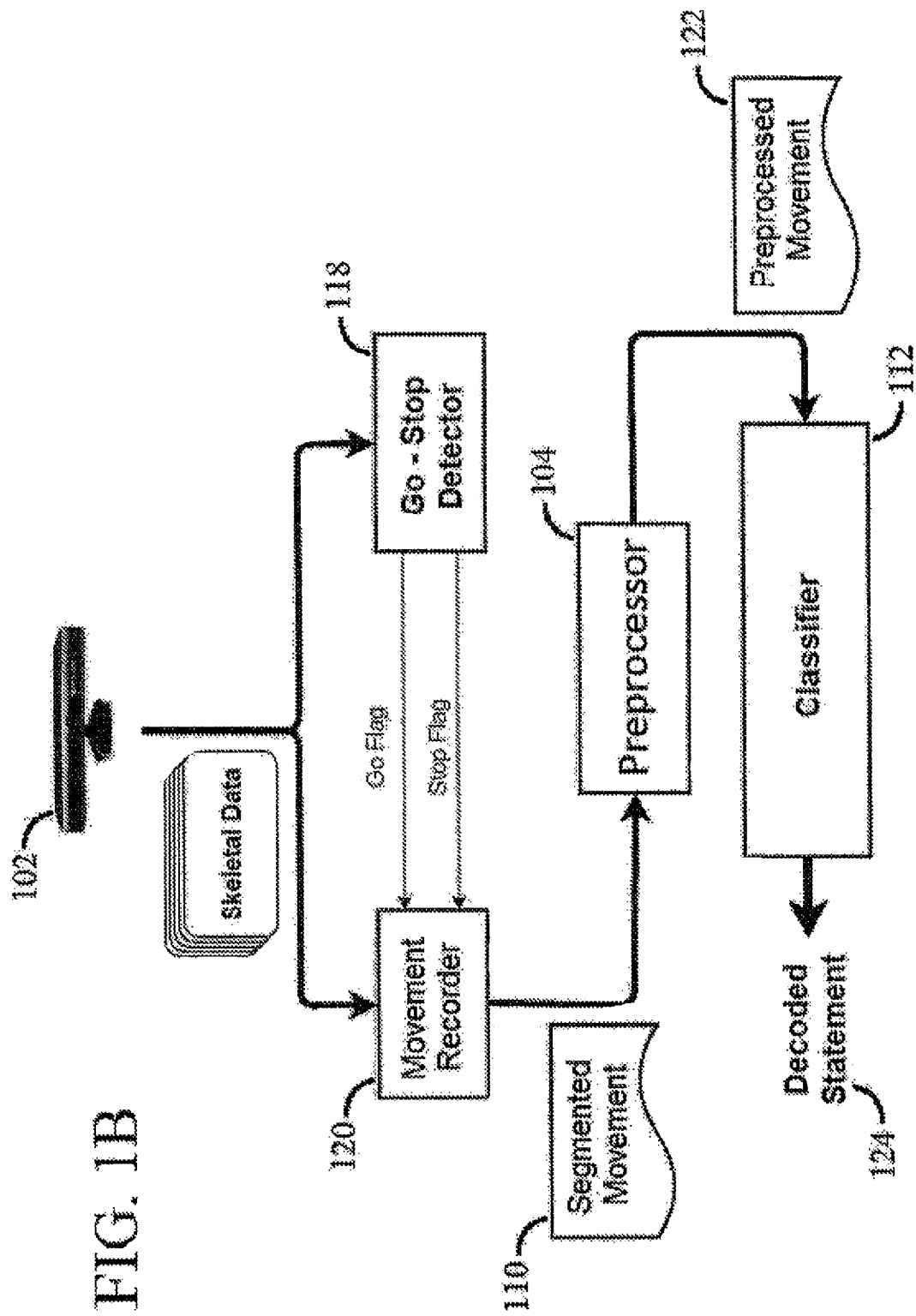
FIG. 1B illustrates a field implementation of the "live testing" engine component of the automatic body movement recognition and association system in accordance with implementations of this disclosure.

FIG. 1B is a block diagram of a field implementation of the engine component 106 of the automatic body movement recognition and association system 100 in accordance with implementations of this disclosure. The engine component 106 produces text or speech based on the segmented movements 110 processed by the preprocessing component 104 using the classifier component 112. The system 100 uses 3D body movement data read from the depth-sensing camera 102 from a user and then the preprocessing component 104 processes the 3D data based on a go-stop scheme to recognize segments of body movement. The go-stop scheme requires the user to add a transition posture or pose, such as putting his/her hands down, between each body movement in a body movement sequence. The transition posture detector module 118 processes the 3D data read from the depth-sensing camera 102 to detect the presence of the transition posture. The detection of the transition posture separates body movements in the body movement sequence and the movement recording module 120 stores the sequence of movements as segmented movements 110. The movement recording module 120 can be read only memory (ROM), random access memory (RAM) or any other suitable memory device. The preprocessor 104 processes the segmented movements 110 between the transition postures, described as an abstract below with reference to FIG. 5 and described in detail in FIGS. 8, 9, and 13, and provides the preprocessed movements 122, based on the segmented movements 110, to the classifier module 112 that associates the preprocessed movements 122, using a body movement recognition system algorithm, such as a Hidden Markov Model (HMM) in this exemplary implementation, to produce a decoded statement 124 as text or speech. Other body movement recognition system algorithms can be used instead of the Hidden Markov Model.

An "off-line" training system 108, shown in FIG. 1A, works independently from the system 100 to continually build a training data set 114 and improve a learning system 116 that can be used by the classifier component 112 in the engine component 106. The training system 108 comprises its own preprocessing component 104 that processes 3D data, the transition position detector 118, the body movement recording module 120. The preprocessing component 104 processes data from the training data set 114 and/or processes 3D data that is read from the depth-sensing camera 102, as described below in relation to the engine component 106. The preprocessing component 104 continues to run "off-line" without any further interaction with the depth-sensing camera 102 when it is not receiving data from the depth-sensing camera 102. The training data set 114 includes a plurality of body movements, gestures, or signs that are stored in the training system 108. The training system 108 will continually test the body movement samples in the training data set 114 to determine if recognition and association accuracy can be improved. The training system 108 can also add additional body movements received as preprocessed movements from the preprocessing component 104 to the training data set 114. The training data set 114 is analyzed in the learning system 116 to determine whether the additional data in the training data set 114 improves accuracy. When the training data set 114 is determined to improve accuracy, the learning system 116 sends movement models, learning configurations, and leanings models to the classifier component 112 to improve the accuracy of the system 100.

Figure 2:
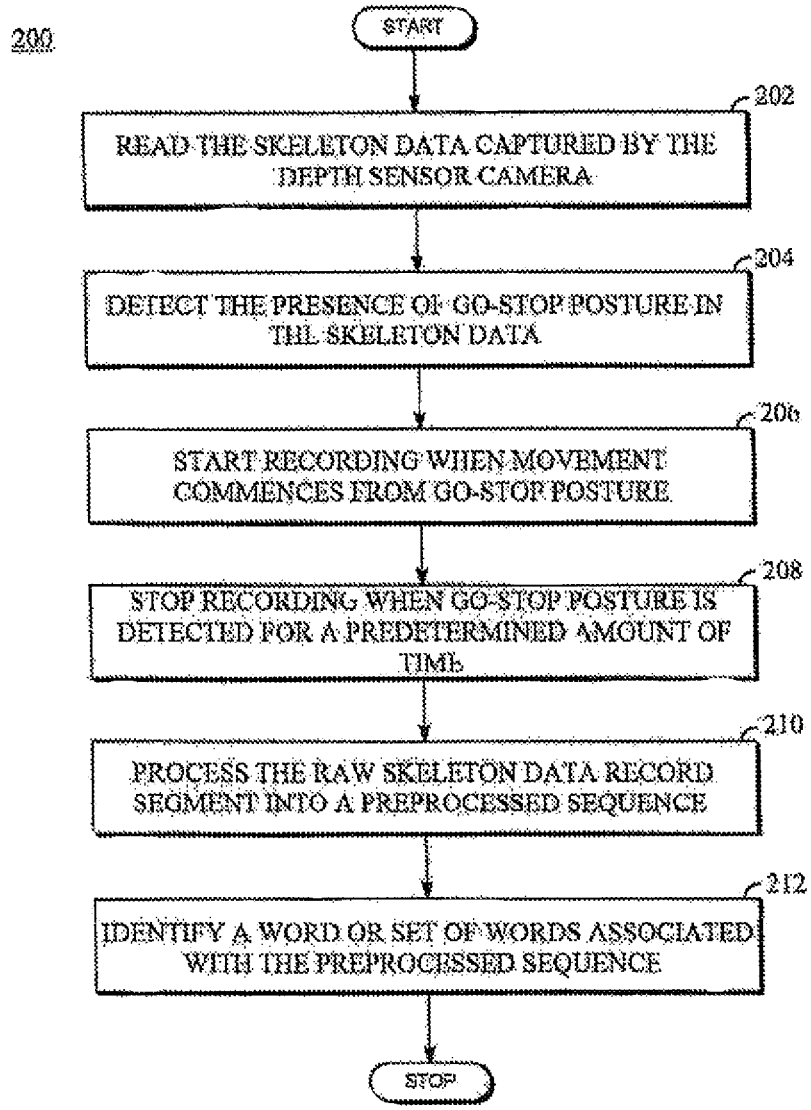
FIG. 2 illustrates a flow diagram of a process for recognizing body movement and associating the body movement with a meaning in accordance with an implementation of this disclosure.

FIG. 2 is a flow diagram showing a process 200 for recognizing body movement and associating the body movement with a meaning in accordance with an implementation of this disclosure. The depth-sensing camera 102 captures data streams as a sequence of frames that include color frame and depth frame from which a skeleton stream is estimated. The skeleton stream contains 3D data about the main 20 human skeleton joints or points which comprise 3D coordinates of the location of each joint relative to the depth-sensing camera's 102 three main axes. The system 100 tracks the nearest human in front of the depth-sensing camera 102 that is at least one meter away from the depth-sensing camera 102 and reads the skeleton data 202 captured by the depth-sensing sensor camera 102.

The transition posture detector module 118 processes the 3D data, recognizing the different skeletal points and their relation to one another, to detect the presence of the transition posture 204, relying on measuring the speed and positions of the skeletal joints or points, and recognizing the different skeletal points and their positions relative to other skeletal points and positions in the 3D space. The transition posture detector module 118 analyzes the 3D data to determine if the 3D data contains the 3D coordinates of the skeletal points associated with the specific transition posture. The scheme used by the transition posture detector module 118 to determine the specific transition posture to be detected, indicating that the system receive data for processing, is configurable and depends on the intended application where the system will be utilized, whether it be a medical application, military application, psychology, sign language, or other application that needs to detect specific body movements. According to the application, the transition posture detector module 118 is programmed with the proper 3D coordinates of the skeletal points of interest of the desired transition posture and those 3D coordinates are used to compare to the 3D data.

Detecting the transition posture can be explained further using an example scheme for an exemplary sign language application. For explanation purposes, the exemplary sign language implementation of the system 100 calculates Rx, Ry, Rz, Lx, Ly, and Lz values based on the 3D skeleton joints data, where Rx is the horizontal difference between the user's right hand joint and hip center joint (RHx-HCx), Ry is the vertical difference between the user's right hand joint and hit center joint (RHy-HCy), Rz is the depth difference between the user's right hand joint and hip center joint (RHz-HCz), Lx is the horizontal difference between the user's left hand joint and hip center joint (LHx-HCx), Ly is the vertical difference between the user's left hand joint and hip center joint (LHy-HCy), and Lz is the depth difference between the user's left hand joint and hip center joint (LHz-HCz). When Rx and Lx are within a predetermined range, the user is determined to be in the default position, signifying the transition posture. When Rx and Lx are not within the predetermined range, the user is determined to be performing a sign.

The transition posture detector module 118 sends a start signal to the recording module 120 to begin recording 206 when movement commences from the transition posture, as shown in the transition from the go-stop posture in FIG. 4A to the body movement in FIG. 4B. The transition posture detector module 118 sends a stop signal to the recording module 120 to stop recording 208 when the user's hands have returned to the transition posture, as shown in the transition from the body movement in FIG. 4B to the transition posture in FIG. 4C, for a predetermined amount of time or for a predetermined amount of frames in order to account for noise. In this exemplary implementation, the transition posture must be validated, or present, for at least 90 msecs or at least three subsequent frames, otherwise the transition posture detector module 118 considers the position as a noisy measurement. The recorded segmented movement 110 comprises the raw skeleton data read from the depth-sensing camera 102 between transition postures.

Figure 5:
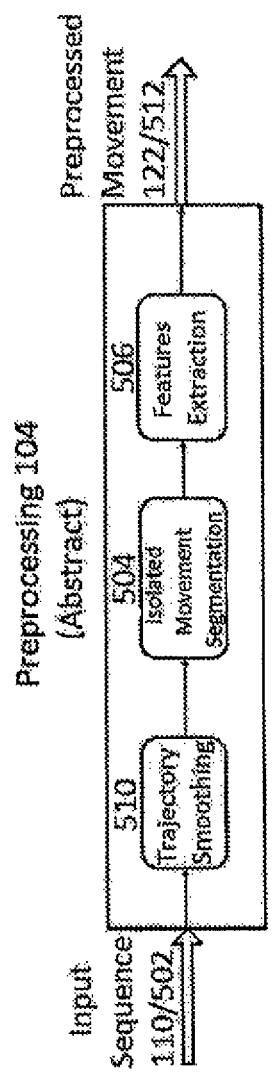
FIG. 5 illustrates an abstract block diagram of an preprocessing component used by the automatic body movement recognition association system and the "off-line" training system in accordance with implementations of this disclosure.
Figure 9:
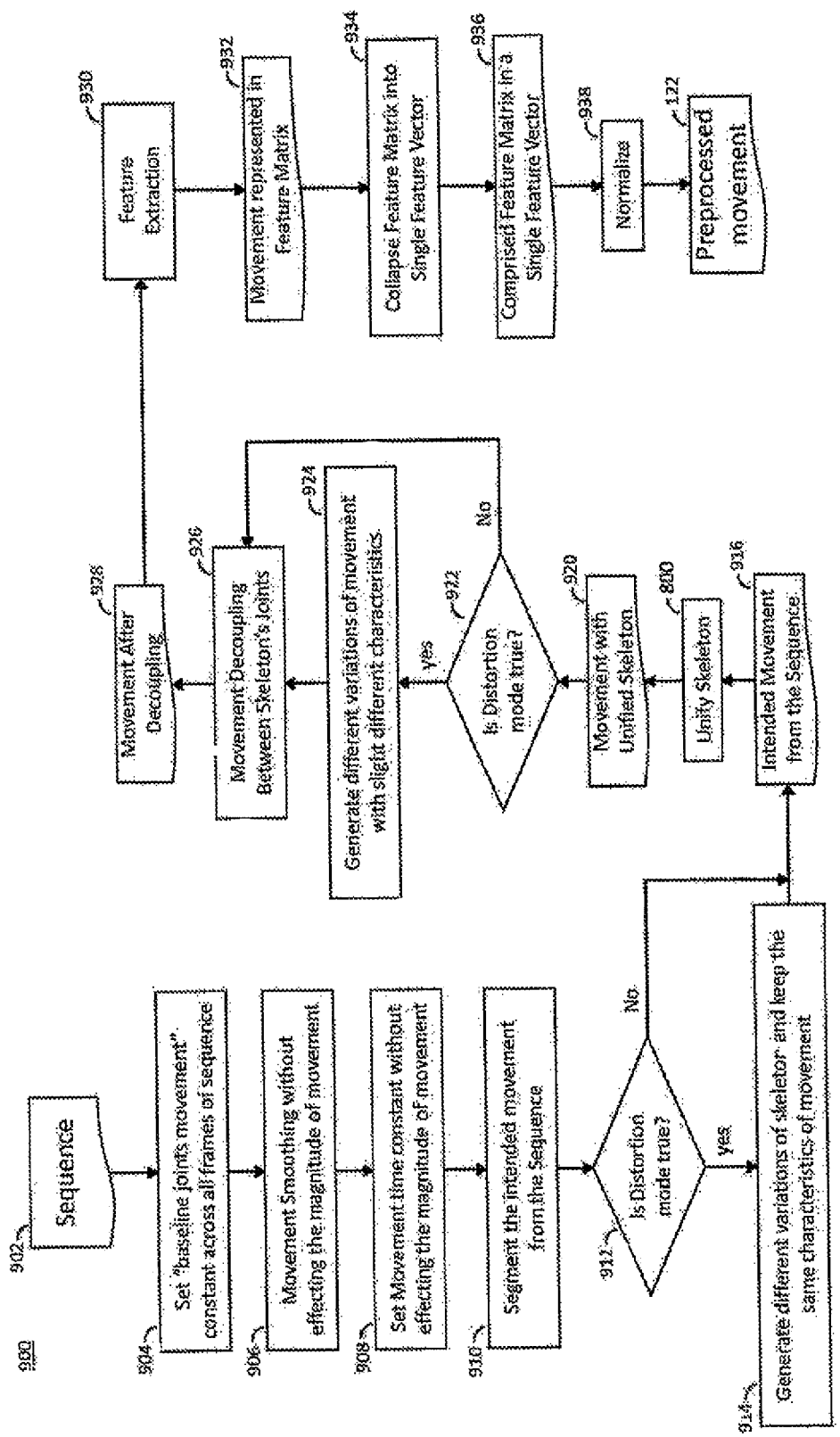
FIG. 9 illustrates a flow diagram of an exemplary process for preprocessing body movement data in accordance with an exemplary implementation of this disclosure.

Referring to FIG. 5, which is an abstract representation of the preprocessing component and which is shown in detail in FIG. 9, the preprocessing component 104 processes the segmented movement 110 in three consecutive steps that include relative positioning/feature extraction and low pass filtering to ensure distance invariance and to remove noise fluctuations 210. In this exemplary implementation, the preprocessing component 104 receives the segmented movement 110/502 and applies a low-pass filter 510, providing trajectory smoothing, on the samples to smooth the value of the samples. The preprocessing component 104 then identifies the isolated movement segmentation 504 from the smoothed segmented movement 110/502. The preprocessing component 104 processes the isolated movement segmentation 504 using feature extraction 506. The isolated movement segmentation 504 includes the positions, or locations, of the user's skeletal points relative to the depth-sensing camera 102 as a set of 3D coordinates. The locations of the user's skeletal points depend on the location in which the user is standing in front of the camera 102.

After feature extraction 506, the preprocessing component 104 send the preprocessed sequence 122/512 to the classifier component 112 which then processes the preprocessed sequence 122 to identify the decoded statement 124 associated with the preprocessed sequence 212, such as the written or spoken word meaning of the sign or signs performed by the user. In this exemplary implementation, the classifier component 112 utilizes HMM for sign language recognition. In alternate embodiments, the classifier component 112 can use other vision based sign language recognition systems, such as Parallel HMM, Context-Dependent HMM, and Product-HMM.

Figure 3:
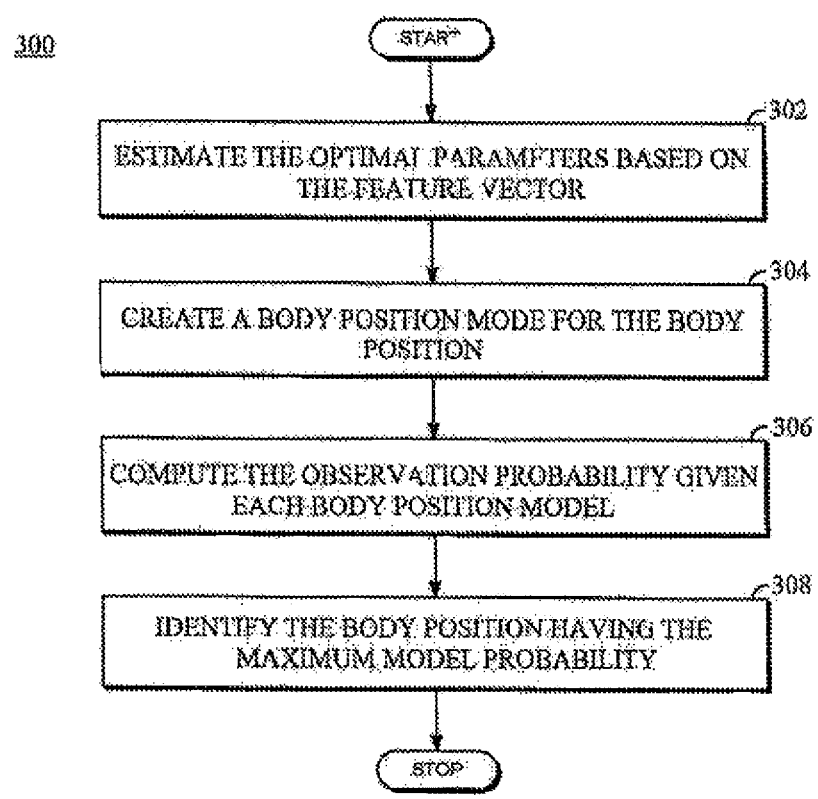
FIG. 3 illustrates a flow diagram for building an isolated body movement recognizer in the training component of the automatic body movement recognition and association system in accordance with an exemplary implementation of this disclosure.

FIG. 3 is a flow diagram showing a process 300 for building an isolated body movement recognizer in the "off-line" training system 108 that can be used with the automatic body movement recognition and association system in accordance with an exemplary implementation of this disclosure. A classifier component 112 can be built for a wide variety of body movements that are to be associated with words or meaning. For example, the body movements can be associated with the written or spoken words associated with the sign language movement captured by the depth camera 102. In this exemplary sign language implementation, the classifier component 112 uses a left-right HMM with no skip transitions, as shown in FIG. 6, to build an isolated sign language recognizer. The first step is to determine the number of hidden states. In this exemplary implementation, the system 100 works with eight hidden states empirically and uses continuous Gaussian emission probability distribution (Gaussian), in which each hidden state is a multivariate Gaussian with means and covariances that can be specified with the Baum-welch learning algorithm, to govern the observation sequence generation. The system 100 trains a single HMM per sign using the Baum-welch learning algorithm in the library. The system 100 utilizes a relatively large number of training samples, such as 30 samples per sign in this exemplary implementation, and uses Gaussian with a full covariance matrix for the six features in the FV. After all HMMs have been trained, a new sample can be easily recognized by determining the start point and end points, segmenting the sign to be classified, identifying the FV, providing the FV to all HMMs, determining the probabilities P(FV) for each FV for all HMMs, and identifying the sign comprising the highest probability.

For explanation purposes, for example, a set of N signs to be recognized, a training set of M samples for each sign, and an independent test set are provided. In order to build the HMM classifier, an HMM for each sign in the vocabulary is built. The system 100 estimates the optimal parameters 302 based on the feature vector extracted from the preprocessing steps as observations from the set of M samples for each sign and creates a sign model $\lambda_i$ 304 for the ith vocabulary sign, from $1 \leq i \leq N$, using Baum-Welch training algorithm for parameter estimation and model creation. For each sample in the test set, described by the observation sequence built from preprocessed movement feature vectors $O=O_1$, $O_2, \ldots, O_T$ and for each sign model compute the observation probability 306 given each sign model $P_i=(O1 \lambda_i)$ using the forward-backward algorithm. Identify the sign having the maximum model probability 308, i.e., $i^*=\text{argmax}[P_i]$ $1 \leq i \leq N$.

In an alternate embodiment, the system 100 can comprise two different classifier components, a classifier component 112 for one-handed signs and another classifier component 126 (not shown) for two-handed signs, thereby allowing the system 100 to switch between classifier component 112 and classifier component 126 based on an algorithm that classifies the body movement as either a one-handed movement or a two-handed movement to automate switching.

Figure 7:
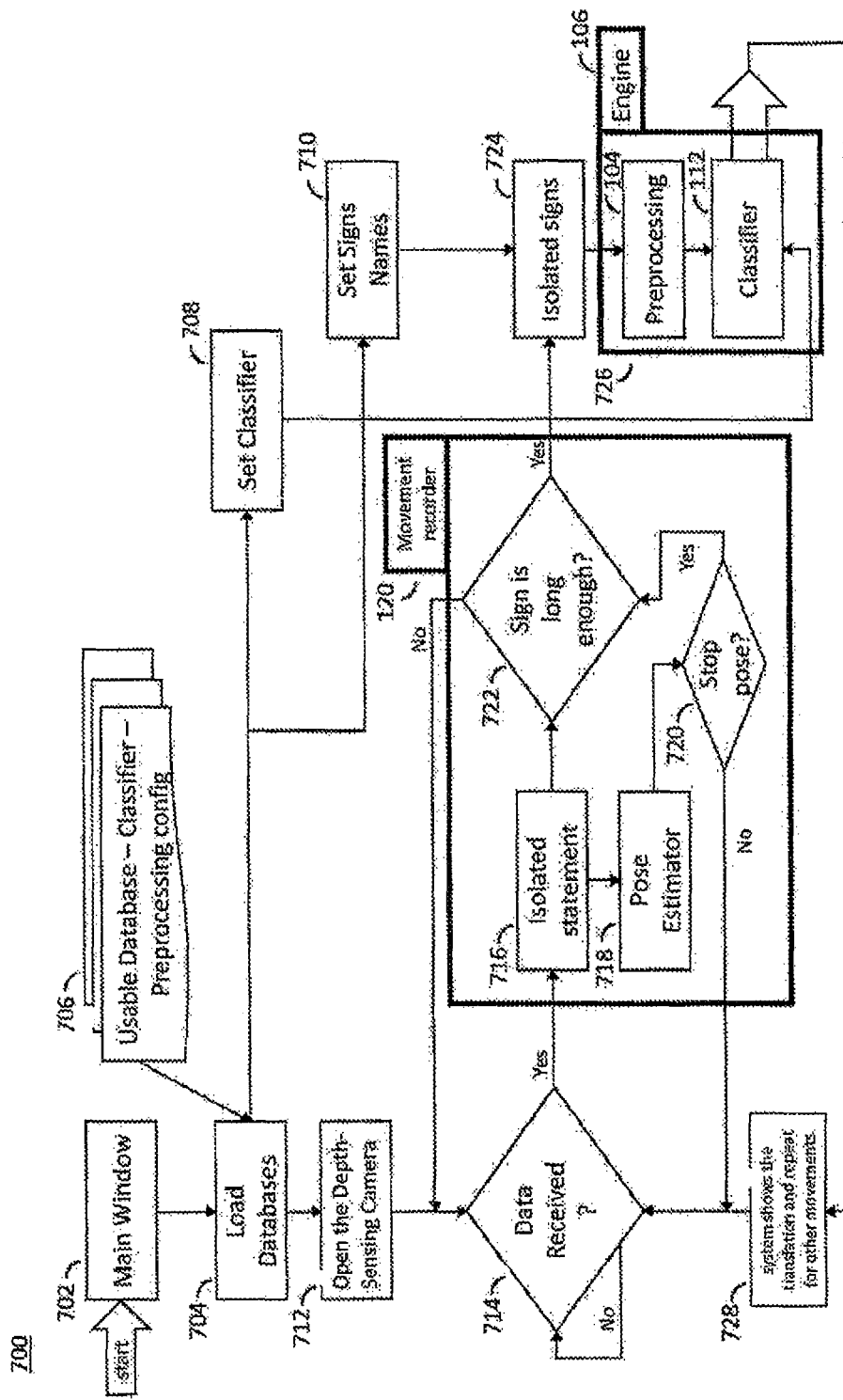
FIG. 7 illustrates a flow diagram of an exemplary process for recognizing body movement and associating the body movement with a meaning in accordance with an implementation of this disclosure.

An exemplary implementation of the "live testing" engine component 106 and the "off-line" training system 108 are shown in FIGS. 7-12. FIG. 7 is a flow diagram showing an exemplary process 700 for recognizing body movement and associating the body movement with a meaning in accordance with an implementation of this disclosure. The process 700 begins by displaying a main window 702 proceeds to load databases 704 using at least one of usable databases, classifiers, and/or preprocessing configurations 706. The classifier 112 is set 708 based on at least one of the usable databases, classifiers, and/or preprocessing configurations 706. The body movement signs are assigned names 710 based on the information received when the databases are loaded 704 and based on at least one of the usable databases, classifiers, and/or preprocessing configurations 706. Once the databases are loaded 704, the depth-sensing camera 102 is opened 712 to receive body movement data. Step 714 identifies if data is received from the depth-sensing camera 102. If data is not received, process 700 loops back to step 714 to identify if data is received from the depth-sensing camera 102. When data is received in step 714, the data is sent to movement recording module 120 where the data is received as an isolated statement 716. The isolated statement is sent to the pose estimator 118 718. The pose estimator 118 identifies when the isolated statement contains the go-stop scheme 720. If the go-stop scheme is not detected in step 720, process 700 loops back to step 714 to identify if data is received from the depth-sensing camera 102. When the go-stop scheme is detected in step 720, the isolated statement is sent to step 722 that determines whether the isolated statement is long enough in length, duration, and/or frames 722. If the isolated statement is not long enough in step 722, process 700 loops back to step 714 to identify if data is received from the depth-sensing camera 102. When the isolated statement is long enough, the isolated statement and the names assigned to the body movement signs at step 710 are sent to step 724 that identifies isolated signs. The isolated signs are sent to engine 106 where the preprocessing component 104 processes the isolated signs into preprocessed movements 122. The preprocessed movements 122 are then sent to the classifier 112 that was set in step 708 to identify a word or set of words associated with the preprocessed movements 122. The system 100 shows the words, set of words, and/or translation 728 and then loops back to step 714.

Figure 8:
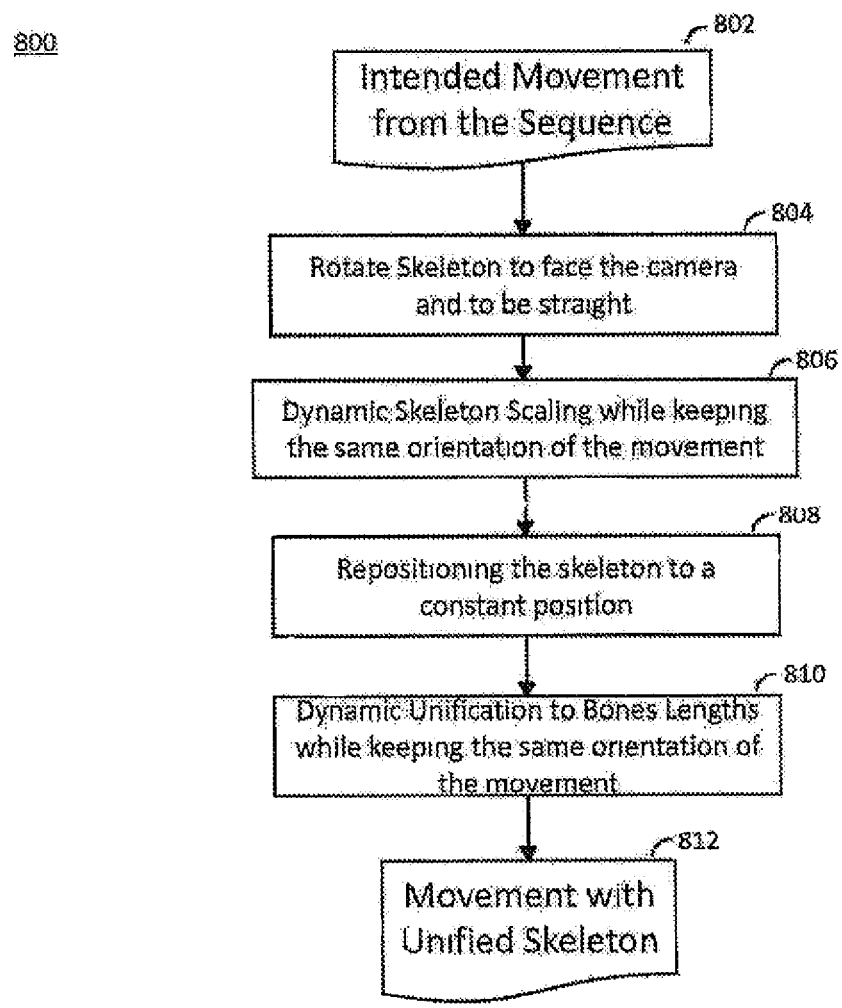
FIG. 8 illustrates a flow diagram of an exemplary process for preprocessing body movement data in accordance with an exemplary implementation of this disclosure.

FIGS. 8 and 9 are flow diagrams showing exemplary processes 800 and 900 for preprocessing body movement data in accordance with an implementation of this disclosure. FIG. 8 is a flow diagram showing an exemplary process 800 for preprocessing data into movement with a unified skeleton. Process 800 removes variables, such as how far away a person is standing from the depth-sensing camera 102 and how a person is standing, whether the person is standing with their left side facing the depth-sensing camera 102, whether the person is standing with their right side facing the depth-sensing camera 102, and whether the person is standing facing the depth-sensing camera 102, thereby increasing the accuracy of the system 100 regardless of the orientation of the user by ensuring that the data all has the same orientation. Process 800 allows the system 100 to unify the movement over different skeleton and different positions to keep the accuracy at the same level with different positions and bodies for the user who performs the movement.

Process 800 begins by receiving an intended movement from a sequence of body motions 802 and rotating the skeleton data to face the depth-sensing camera 102 and be straight with the depth-sensing camera 102 804. Process 800 determines a dynamic skeleton scaling while keeping the same orientation of the intended movement 806 and repositions the skeleton to a constant position 808. Process 800 determines a dynamic unification to bones lengths while keeping the same orientation of the intended movement 810 to produce a movement with a unified skeleton 812. Process 800 is continually performed as new movement data is received.

FIG. 9 is a flow diagram showing an exemplary process 900 for preprocessing data into a preprocessed movement. Process 900 can be used to generate the preprocessed movement 122 used in the "live testing" engine component 106 and the "off-line" training system 108. Process 900 provides a plurality of samples from a single sample, thereby increasing the accuracy and stability of the classifier 112, by repeating the preprocessing process at the training time of the classifier with the distortion mode on. Enabling the distortion mode allows the classifier to understand different variations of a certain movement. The distortion mode must be turned off in preprocessing when translating movements in the "live testing" engine component 106.

Process 900 begins by receiving sequence of movements 902 and setting "baseline joints movement" constant across all frames of the sequence 904. Process 900 performs movement smoothing without effecting the magnitude of the movement 906 and sets the movement time constant without effecting the magnitude of the movement 908. The magnitude of the movement includes all motion that occurs within the sequence that is being preprocessed. The intended movement is segmented from the sequence 910. Step 912 identifies whether the distortion mode is on or off. If the distortion mode is on, process 900 generates different variations of the skeleton while keeping the same characteristics of the movement 914, thereby generating more samples for the movement for various skeletons having various physical characteristics. If the distortion mode is off, or after different variations of the skeleton have been generated in step 914, the intended movement from the sequence 916 is processed to unify the skeleton 800, as shown in process 800 of FIG. 8. Process 900 then identifies the movement with the unified skeleton 920. Step 922 identifies whether the distortion mode is on or off. If the distortion mode is on, process 900 generates different variations of the movement with slightly different characteristics 924, thereby allowing some tolerance in case a movement is not performed exactly how it should be, such as where the hands are placed too high and/or too far away from the body. If the distortion mode is off, or after different variations of the movement have been generated in step 924, the movement is decoupled between the skeleton's joints 926, separating data between joints and distinguishing between joint movement and body part movement, producing a movement after decoupling 928. The decoupled movement 928 is then processed using feature extraction 930, explained in greater detail in FIG. 13, which produces a movement represented in a feature matrix 932. The feature matrix is collapsed into a single feature vector 934 where the feature matrix comprises a single feature vector 936. By providing a data point for each joint for each movement, collapsing the sequence of data points into one point on a feature space, and collapsing the sequence into a matrix having one row, makes the system 100 more accurate, reduces the training time of the system 100, and prevents performance reduction and speed reduction of the system 100. The single feature vector is then sent to a normalizer 938 that performs data steps to make features independent from each other and produces the preprocessed movement 122.

Figure 10:
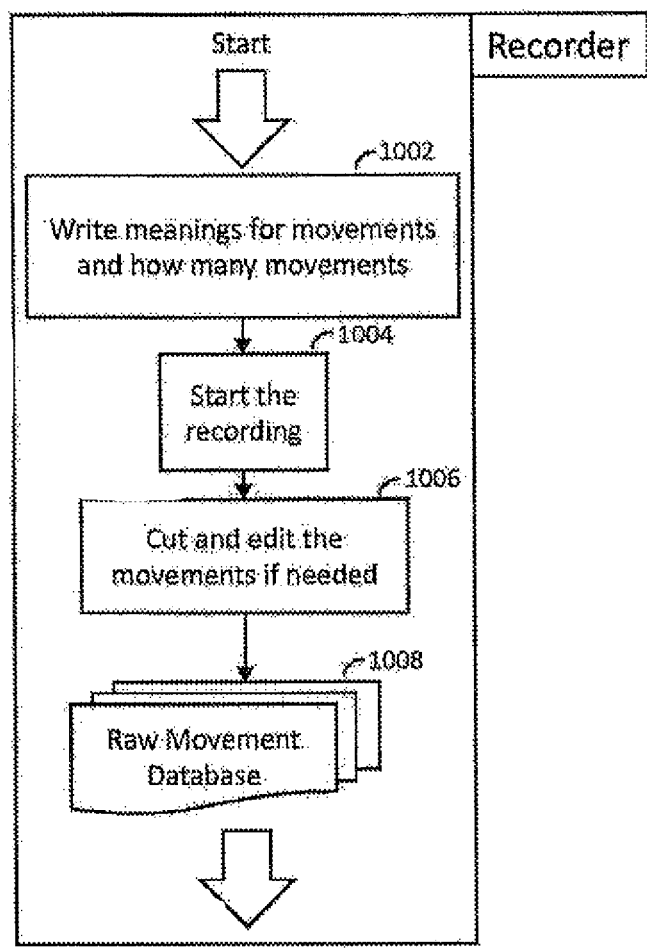
FIG. 10 illustrates a flow diagram of an exemplary process for building an isolated body movement recorder in the training component of the automatic body movement recognition and association system in accordance with an exemplary implementation of this disclosure.
Figure 11:
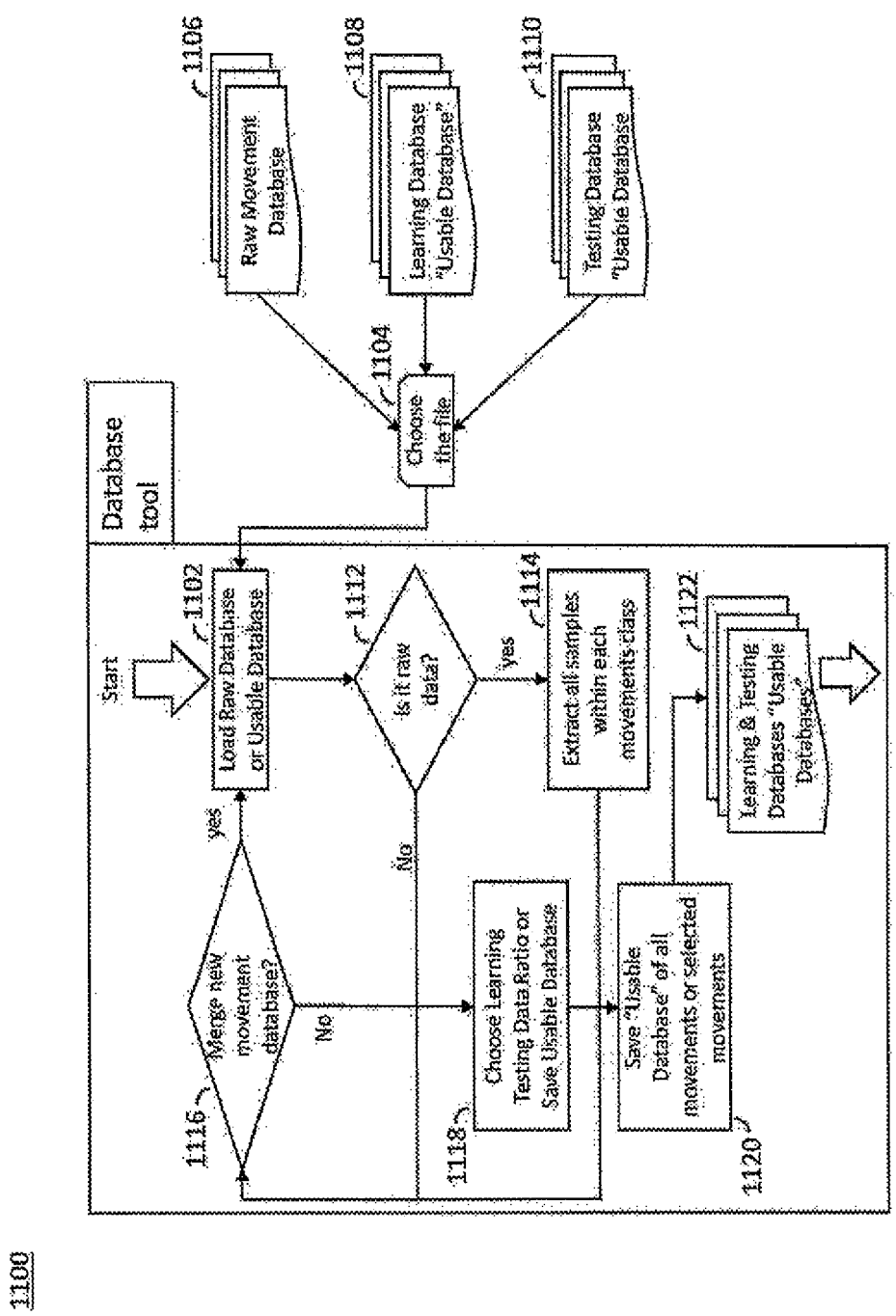
FIG. 11 illustrates a flow diagram of an exemplary database tool process in the training component of the automatic body movement recognition and association system in accordance with an exemplary implementation of this disclosure.
Figure 12:
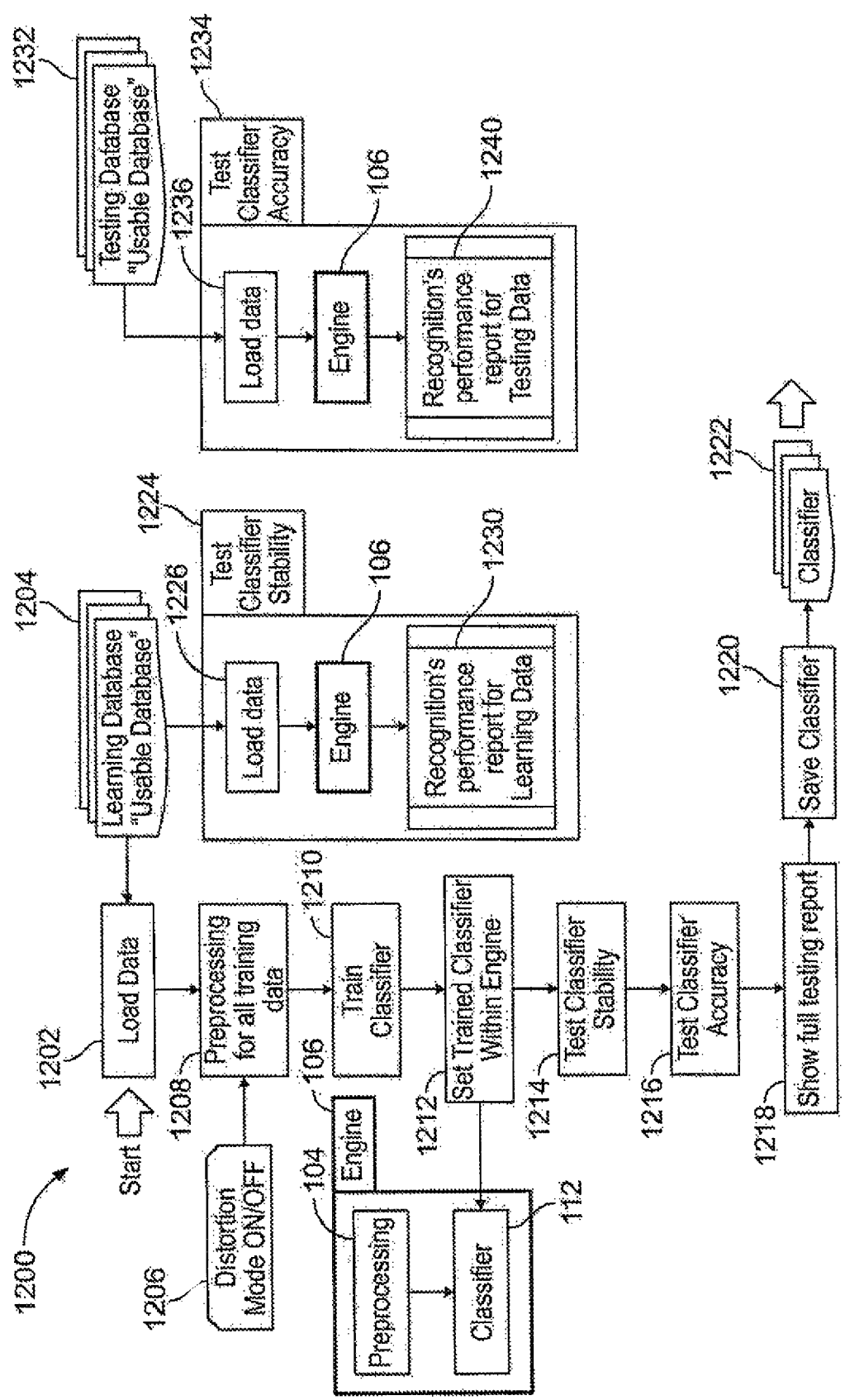
FIG. 12 illustrates a flow diagram of an exemplary process for building an isolated body movement recognizer in the training component of the automatic body movement recognition and association system in accordance with an exemplary implementation of this disclosure.

FIGS. 10-12 are flow diagrams showing processes 1000, 1100, and 1200 for building an isolated body movement recorder, database tool process, and in the "off-line" training system 108 that can be used with the automatic body movement recognition and association system in accordance with an exemplary implementation of this disclosure. FIG. 10 is a flow diagram showing an exemplary process 1000 for determining at least one raw movement database. There are a plurality of movement classes, where each class comprises at least one movement. Process 1000 begins by identifying the number of movements and the meanings for those movements 1002 and then starts the recording 1004. The movements are cut and edited if needed 1006, such as when the user makes a wrong move while performing a specific body movement and/or sign. The meanings for the movements, whether cut and edited or not, are then stored in at least one raw movement database 1008. Process 1000 is adapted to generate at least one raw movement data base.

FIG. 11 is a flow diagram showing an exemplary process 1100 for determining at least one usable database. Process 1100 begins by loading at least one of raw databases and/or usable databases 1102 by choosing the file 1104 from at least one raw movement database 1106, at least one learning usable database 1108, and at least one testing usable database 1110. Usable databases are those that can be sent to the preprocessing system 104 and the classifier 112. Step 1112 identifies whether the data received in step 1102 is raw data. If the data is raw, process 1100 extracts all samples within each movement class 1114, wherein each movement class may include a plurality of samples. If the data is not raw, or after all samples within each movement class are extracted in step 1114, step 1116 determines whether to merge the new movement database with the currently loaded database to form a single database. If the new movement database is merged, the process 1100 loops back to step 1102. If the new movement database is not merged, process 1100 chooses the learning testing data ratio and/or saves the usable database 1118. Process 1100 the saves the usable database of all movements and/or selected movements 1120 and then identifies at least one of at least one learning usable database and at least one testing usable database 1122, which can then be sent to the preprocessing system 104 and/or the classifier 112.

FIG. 12 is a flow diagram showing an exemplary process 1200 for determining at least one classifier. The process 1200 begins by loading databases 1202 using at least one learning usable database 1204. Process 1200 performs preprocessing for all training data 1208, the preprocessing taking into account whether the distortion mode is on or off 1206. The preprocessed training data is sent to a train classifier 1210 and the trained classifier is sent to the engine 106 to set classifier 112. Process 1200 continues to test the train classifier stability 1214 and test the train classifier accuracy 1214. A lookup table may be used to determine if a higher accuracy is available. A full testing report is generated 1218, based on the stability and accuracy, and the train classifier is saved 1220 to a group of at least one classifier 1222. The at least one usable database 1204 is also sent to test the classifier stability 1224 where the data is loaded 1226 and sent to the engine 106. The test classifier stability 1224 generates a recognition performance report for the learning data 1230. At least one testing usable database 1232 is sent to test the classifier accuracy 1234 where the data is loaded 1236 and sent to the engine 106. The test classifier accuracy 1234 generates a recognition performance report for the testing data 1240. The full testing report 1218 is based on at least one of the recognition performance report for the learning data and the recognition performance report for the testing data.

Figure 13:
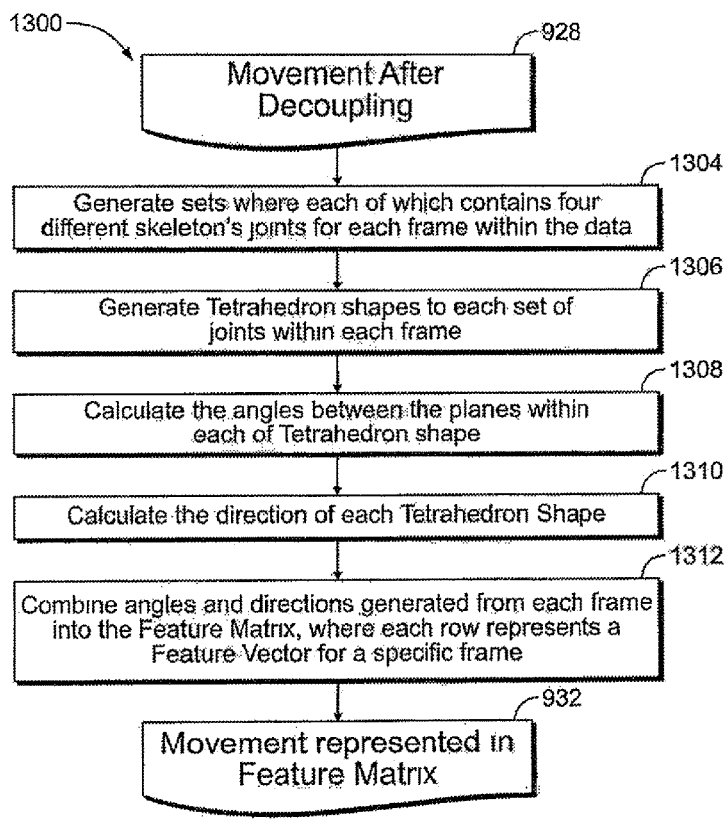
FIG. 13 illustrates a flow diagram of an exemplary feature extraction process for preprocessing body movement data in accordance with an exemplary implementation of this disclosure.
Figure 14:
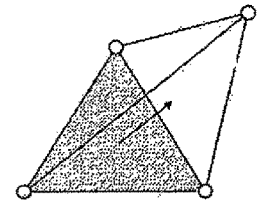
FIG. 14 illustrates a single three-dimensional tetrahedron and a tetrahedron direction arrow based on four different skeleton joints in accordance with an exemplary implementation of this disclosure.

FIG. 13 is a flow diagram showing an exemplary feature extraction process 1300 for preprocessing body movement data. Process 1300 begins by taking the decoupled movement 928, shown in FIG. 9, to generate at least one set, wherein each set comprises four different skeleton joints for each frame within the data 1304. Tetrahedron shapes, such as the exemplary tetrahedron shape of FIG. 14, for each set of joints within each frame are generated 1306. Process 1300 calculates the angles between the planes within each of the tetrahedron shapes 1308 and calculates the direction of each tetrahedron shape 1310, as shown in the arrow in FIG. 14. Process 1300 combines the angles and directions generated from each frame into the feature matrix 1312, wherein each row represents a feature vector for a specific frame, and then identifies the movement represented in a feature matrix 932, as shown in FIG. 9.

For simplicity of explanation, process 200, process 300, and processes 700-1300 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

While the present disclosure has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for building an isolated body movement recognizer comprising:
   identifying at least one learning database comprising a plurality of training data, the plurality of training data comprising at least a sequence of body motions;
   preprocessing, using a preprocessing component, the plurality of training data into preprocessed training data;
   training a classifier based on the preprocessed training data;
   testing a stability of the classifier;
   testing an accuracy of the classifier;
   generating a full testing report based on the stability and the accuracy of the classifier; and
   storing the classifier to a plurality of classifiers.

2. The method of claim 1, further comprising:
   testing, using an engine component, a plurality of learning data from the at least one learning database;

generating a recognition performance report based on the learning data; and determining the stability of the classifier based on the recognition performance report.

3. The method of claim 1, further comprising:

identifying at least one testing database comprising a plurality of testing data;

testing, using an engine component, the plurality of testing data;

generating a recognition performance report based on the testing data; and determining the accuracy of the classifier based on the recognition performance report.

4. A method for building an isolated body movement recognizer comprising:

identifying at least one learning database comprising a plurality of training data;

preprocessing, using a preprocessing component, the plurality of training data into preprocessed training data;

training a classifier based on the preprocessed training data;

testing a stability of the classifier;

testing an accuracy of the classifier;

generating a full testing report based on the stability and the accuracy of the classifier;

storing the classifier to a plurality of classifiers;

identifying, using a detection module, a first occurrence of a predetermined position in the training data and a second occurrence of the predetermined position in the training data;

identifying a segment of motions based on the training data, the segment of motions occurring between the first occurrence of the predetermined position and the second occurrence of the predetermined position;

preprocessing, using the preprocessing component, the segment of motions into at least one preprocessed movement; and identifying, using the classifier, at least one meaning based on the at least one preprocessed movement.

5. A method for building an isolated body movement recognizer comprising:

identifying at least one learning database comprising a plurality of training data;

preprocessing, using a preprocessing component, the plurality of training data into preprocessed training data;

training a classifier based on the preprocessed training data;

testing a stability of the classifier;

testing an accuracy of the classifier;

generating a full testing report based on the stability and the accuracy of the classifier;

storing the classifier to a plurality of classifiers;

setting at least one baseline joint movement constant;

smoothing the movement without effecting a magnitude of the movement;

setting a time constant for the movement without effecting the magnitude of the movement;

segmenting an intended movement from the plurality of training data;

identifying at least one variation skeleton of the user's skeleton while maintaining the same characteristics of the intended movement on a condition that a distortion mode is on;

identifying a unified skeleton;

identifying at least one variation movement on a condition that the distortion mode is on, the at least one variation movement having slightly different characteristics than the intended movement;

decoupling the intended movement between a plurality of dynamic points;

building a feature matrix based on the decoupled intended movement;

identifying a feature movement represented in the feature matrix;

collapsing the feature matrix into a single feature matrix vector; and determining the preprocessed movement using a normalizer for the feature matrix.

6. The method of claim 5, further comprising:

identifying at least one set wherein each set includes at least one of the plurality of dynamic points for each frame within the training data;

identifying at least one tetrahedron shape for each set within each frame, the tetrahedron shape comprising a plurality of planes;

determining at least one angle between the plurality of planes of each tetrahedron shape;

determining at least one direction of each tetrahedron shape; and identifying the feature matrix based on the at least one angle and the at least one direction generated from each frame, the feature matrix comprising at least one row, wherein the at least one row represents a feature vector for a specific frame.

7. A method for building an isolated body movement recognizer comprising:

identifying at least one learning database comprising a plurality of training data;

preprocessing, using a preprocessing component, the plurality of training data into preprocessed training data;

training a classifier based on the preprocessed training data;

testing a stability of the classifier;

testing an accuracy of the classifier;

generating a full testing report based on the stability and the accuracy of the classifier;

storing the classifier to a plurality of classifiers;

loading a database, the database comprising at least one of a raw database, a learning usable database, and a testing usable database, the at least one raw database, the learning usable database, and the testing usable database each comprising at least one movement class; and identifying a plurality of samples within each movement class on a condition that the database comprises the raw database.

8. The method of claim 7, further comprising:

at least one of identifying a learning testing data ratio and saving the database;

saving the database comprising at least one of a plurality of movements and a subset of movements selected from the plurality of movements; and identifying at least one of at least one new learning usable database and at least one new testing usable database.

9. The method of claim 8, further comprising:

sending at least one of the at least one new learning usable database and the at least one new testing usable database to at least one of the preprocessing component and the classifier.

10. The method of claim 7, further comprising:

identifying a new movement database comprising the plurality of samples within each movement class; and merging the new movement database with the database.

* * * * *